United States Patent [19]

Loizeau

[11] Patent Number: 4,547,176
[45] Date of Patent: Oct. 15, 1985

[54] TORSIONAL DAMPER

[75] Inventor: Pierre Loizeau, Ville d'Avray, France

[73] Assignee: Valeo, Paris, France

[21] Appl. No.: 577,719

[22] Filed: Feb. 7, 1984

[30] Foreign Application Priority Data

Feb. 21, 1983 [FR] France ................... 83 02767

[51] Int. Cl.[4] ............................................. F16D 3/12
[52] U.S. Cl. ................................... 464/68; 192/106.1
[58] Field of Search .......................... 464/68, 66, 85; 192/106.2, 106.1, 70.17

[56] References Cited

U.S. PATENT DOCUMENTS

| | | | |
|---|---|---|---|
| 2,533,789 | 12/1950 | Goodchild | 192/106.1 X |
| 3,809,198 | 5/1974 | Mori | 464/68 X |
| 3,811,545 | 5/1974 | Sato et al. | 192/106.1 |
| 3,982,617 | 9/1976 | Worner | 192/106.2 |
| 4,156,481 | 5/1979 | Ishida et al. | 464/85 X |
| 4,301,907 | 11/1981 | Carpenter et al. | 464/68 X |
| 4,368,812 | 1/1983 | Steeg | 464/68 X |
| 4,406,357 | 9/1983 | Nagano et al. | 464/68 X |
| 4,433,770 | 2/1984 | Loizeau et al. | 192/106.2 |
| 4,474,276 | 10/1984 | Loizeau | 192/106.1 |

FOREIGN PATENT DOCUMENTS 2521244 8/1983 France.
715512 9/1954 United Kingdom.

*Primary Examiner*—Stephen Marcus
*Assistant Examiner*—Leo J. Peters
*Attorney, Agent, or Firm*—Charles A. Brown; Charles E. Brown

[57] ABSTRACT

A torsional damper comprises at least two coaxial parts rotatable relative to one another within predetermined limits. A plurality of circumferentially acting elastic means are disposed between them in the circumferential direction. These elastic means comprise at least one block of elastic material extending in a substantially tangential direction. The or each elastic material block is partially housed, without circumferential clearance in a rest configuration of the damper, in an opening formed for this purpose in a first of the coaxial parts. It is further partially housed, with circumferential clearance in this rest configuration and for at least one circumferential direction, in an opening formed for this purpose in a second of the coaxial parts. The elastic material block carries at least one elastic material peg projecting from it in at least this circumferential direction. The arrangement is such that, even in the rest configuration, the elastic material peg is in contact with the corresponding radial edge of the housing in the second coaxial part. Thus it comes into action as soon as there is any relative angular movement of the first and second coaxial parts.

11 Claims, 8 Drawing Figures

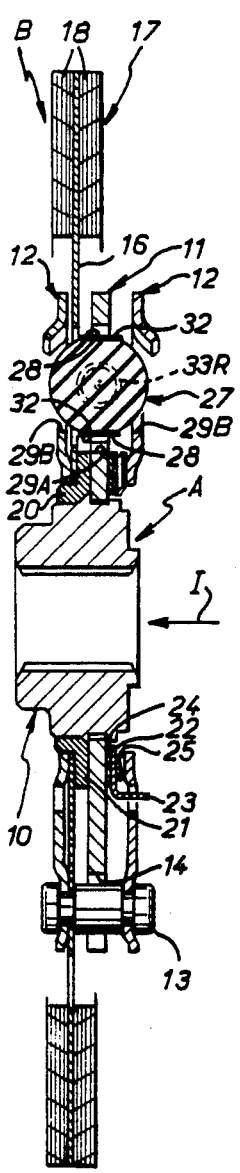
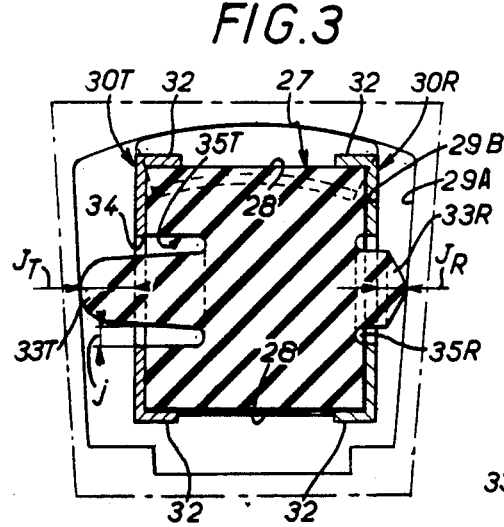
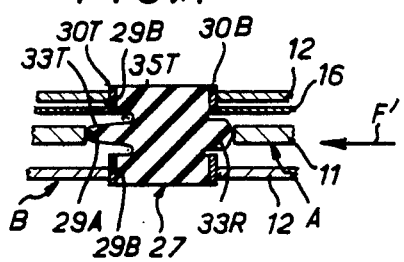
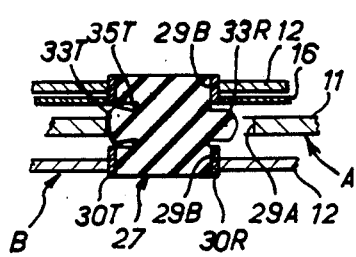
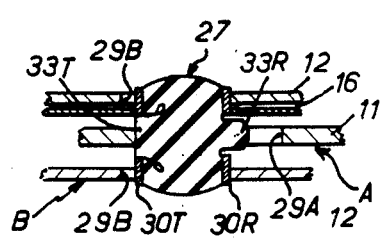
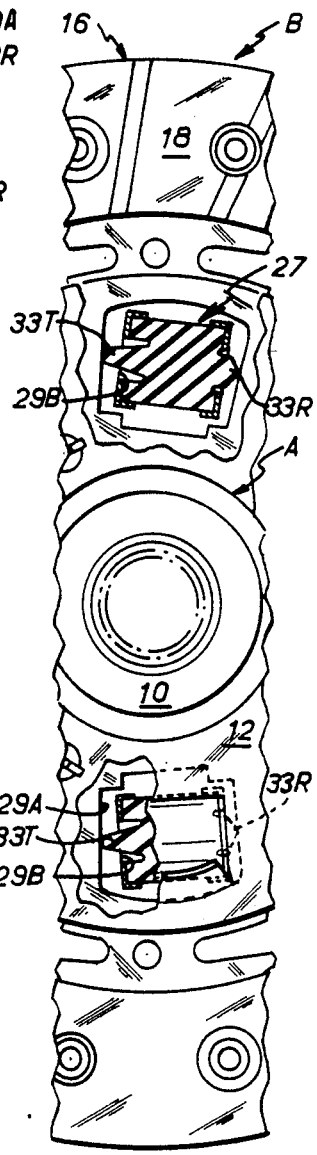

TORSIONAL DAMPER

BACKGROUND OF THE INVENTION

1. Field of the Invention

The present invention is generally concerned with torsional damper devices comprising at least two coaxial parts mounted to rotate relative to one another within a defined range of relative angular movement against circumferentially acting elastic means disposed circumferentially between them.

2. Description of the prior art

As is known, this type of torsional damper device is normally incorporated in the design of a friction clutch, particularly for automotive vehicles, for example, in which case one coaxial part comprises a friction disk designed to rotate with a first shaft, in practice a driving shaft, the motor output shaft in the case of an automotive vehicle, constituting a part referred to hereinafter for convenience as the driving part, whereas the other of said coaxial parts is carried on a hub designed to rotate with a second shaft, in practice a driven shaft, the gearbox input shaft in the case of an automotive vehicle, constituting a part referred to hereinafter for convenience as the driven part.

This type of torsional damper device is used to permit regulated transmission of rotational torque applied to one of its coaxial parts where the other is itself subject to a rotational torque, in other words, to filter vibrations which may arise at any point in the kinematic system in which it is incorporated, extending from the motor to the axles in the case of an automotive vehicle.

More often than not, the circumferentially acting elastic means disposed in the circumferential direction between the driving part and the driven part comprise a plurality of elastic members extending in a substantially tangential direction relative to a circumference of the damper and all partially housed in an opening formed for this purpose in the driving part and partially housed in an opening also formed for this purpose in the driven part.

Also more often than not, the elastic members utilized are helical springs.

It has previously been proposed to substitute blocks of elastic material for all or some of these springs, however.

This is the case, for example, in French patent application No. 82 02034 filed Feb. 9, 1982.

Be this as it may, it is common practice to divide the elastic members constituting said elastic means into at least two separate groups and to delay the action of at least one of these groups during relative angular movement between the driving and driven parts, in order to modulate the stiffness of the elastic means operative between the driving and driven parts according to the extent of relative angular movement between them and thus to improve the adaptation of the damper to the specific filtering effect required.

To this end, whereas, in the rest configuration of the damper, all elastic members used are usually disposed without circumferential clearance in the corresponding openings in the driving part, those whose action is to be delayed are, in this rest configuration, disposed with circumferential clearance in the corresponding openings in the driven part, for one circumferential direction at least, so that they are operative only from the time at which, by virtue of the relative angular movement between the driving and driven parts, this circumferential clearance is absorbed.

However, the stiffness of the elastic means utilized then increases sharply by virtue of the intervention of the second group of elastic members. There sometimes results, when the accelerator pedal of the vehicle is pressed, at least in some specific embodiments, the generation of a noise commonly referred to as a "clunk", whether in motion or stopped. Also, on reversal of the torque between the driving part and the driven part, due to momentary releasing of the accelerator pedal of the vehicle, for example, whether in motion or stopped, there sometimes develops an oscillation phenomenon, the driving part being then subject to very fast retrograde movement followed possibly by it bouncing off the driven part, due to the relatively low stiffness of the first group of elastic members, being the only ones operative at this time.

The noise and oscillation are observed whether the elastic members utilized are springs or blocks of elastic material.

In order to minimize or even eliminate this disadvantage, it is proposed in the aforementioned French patent application No. 82 02034 to constitute the second group of elastic members to come into action using blocks of elastic material and to provide each of these with a peg which, projecting circumferentially from the elastic material block in the appropriate circumferential direction, advantageously comes into action before the block on relative angular movement between the driving and driven parts.

This advantageously brings about a progressive change in the stiffness of the circumferentially acting elastic means concerned.

In practice, an elastic material peg of relatively limited circumferential extent is sufficient for this purpose and, in the aforementioned French patent application No. 82 02034, the free end of an elastic material peg of this kind is, in the rest configuration of the damper, spaced from the corresponding edge of the housing in the driven part in which the elastic material block carrying it is disposed.

A general objective of the present invention is to confer another and advantageous function on the elastic material peg employed.

SUMMARY OF THE INVENTION

The present invention consists in a torsional damper comprising at least two coaxial parts mounted so as to be rotatable relative to one another within predetermined limits of relative angular movement, circumferentially acting elastic means disposed between said coaxial parts in the circumferential direction and comprising at least one block of elastic material extending in a substantially tangential direction relative to a circumference of the damper and partially housed, without circumferential clearance in a rest configuration of the damper, in an opening formed for this purpose in a first of said coaxial parts, and partially housed, with circumferential clearance in said rest configuration and for at least a first circumferential direction, in an opening formed for this purpose in a second of said coaxial parts, wherein said at least one elastic material block carries at least one elastic material peg projecting from it in said first circumferential direction and the arrangement is such that, even in said rest configuration, said at least one elastic material peg is in contact with the corresponding radial edge of said opening in said second coaxial part, whereby it is operative as soon as there is any relative angular movement of said first and second coaxial parts.

In this way an elastic peg of this kind itself constitutes an elastic member of relatively low stiffness, adapted to come into action for low values of relative angular movement of the coaxial parts concerned, the torque to transmit from one of these coaxial parts to the other being itself low at this time.

There results a two-fold advantage.

Firstly, no specific low stiffness elastic member is employed in isolation and this, other things being equal, either releases space for the installation of other elastic members, of greater stiffness, or provides for advantageous reinforcement of the coaxial parts concerned, through minimizing the number of openings to be formed in the latter to accommodate elastic members of this kind.

Also, when the elastic material is crushed it is itself subjected to a significant degree of internal friction, greater in all cases than that to which a simple spring is subject under the same conditions, and the specific friction means which it is common practive to associate with an elastic member of low stiffness to provide the required damping at low values of relative angular movement and torque may with advantage be dispensed with.

All the more so in that, having its free end bearing slightly slantwise on the radial edge of the opening in the driven part in which the elastic material block carrying it is disposed, the elastic material peg in accordance with the invention is subject to movement relative to said radial edge of said opening on relative angular movement of the coaxial parts concerned, and this inevitably generates friction.

The arrangement is accordance with the invention implies that an elastic material peg of this kind is of relatively great circumferential extent, this being considerably greater in all cases than that of the elastic material pegs which are the subject of the aforementioned French patent application No. 82 02034.

Thus this arrangement is not derived in any obvious manner from the latter application.

A problem arises with regard to the accommodation of an elastic member of this kind as it is progressively crushed.

In French patent application No. 82 02034 this problem is solved by virtue of the fact that, there being a distribution and retaining plate disposed around the elastic peg and associated with the elastic material block carrying it, there is provided between this plate and this elastic peg an annular clearance sufficient for the resulting volume to be capable of accommodating the elastic material peg when this is subject to crushing in the circumferential direction.

This solution, whilst satisfactory when the elastic material peg is of relatively limited circumferential extent, is no longer satisfactory when it is of greater extent.

In fact, it would result in an intolerable reduction in the usable surface area of the distribution and retaining plate, prejudicial to its strength, effectiveness and longevity.

From this point of view, the use of an elastic material peg of relatively great circumferential extent is normally ruled out.

In a preferred embodiment of the invention, a particularly simple and satisfactory solution to this problem is provided by a recess on said at least one elastic material block at the root of said at least one elastic material peg carried thereby and adapted to at least partially accommodate said peg when it is crushed in the circumferential direction.

In practice, the size of said recess is made sufficient to totally accommodate said peg when it is crushed in the circumferential direction, allowing for any partial accommodation of said peg in the space formed between it and any distribution and retaining plate, as previously mentioned.

By means of an appropriate choice of the depth of the recess the elastic material peg may be of the required circumferential extent without any concommittant and unwanted reduction in the effective size of the distribution and retaining plate.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 2 is a view of it in axial cross-section on the broken line II—II in FIG. 1.

FIG. 3 shows to a larger scale the detail of FIG. 1 indicated by the box III thereon.

FIG. 4 is a partial view of the torsional damper device in accordance with the invention, to the same scale as in FIG. 1 and projected on to a flat surface, in circumferential cross-section on the line IV—IV in FIG. 1.

FIGS. 5A and 5B are views analogous to that of FIG. 4 and show two consecutive phases in the operation of this torsional damper device.

FIG. 7 is a partial view in elevation analogous to that of FIG. 1 and relating to an alternative embodiment.

DESCRIPTION OF THE PREFERRED EMBODIMENTS

Figure 1:
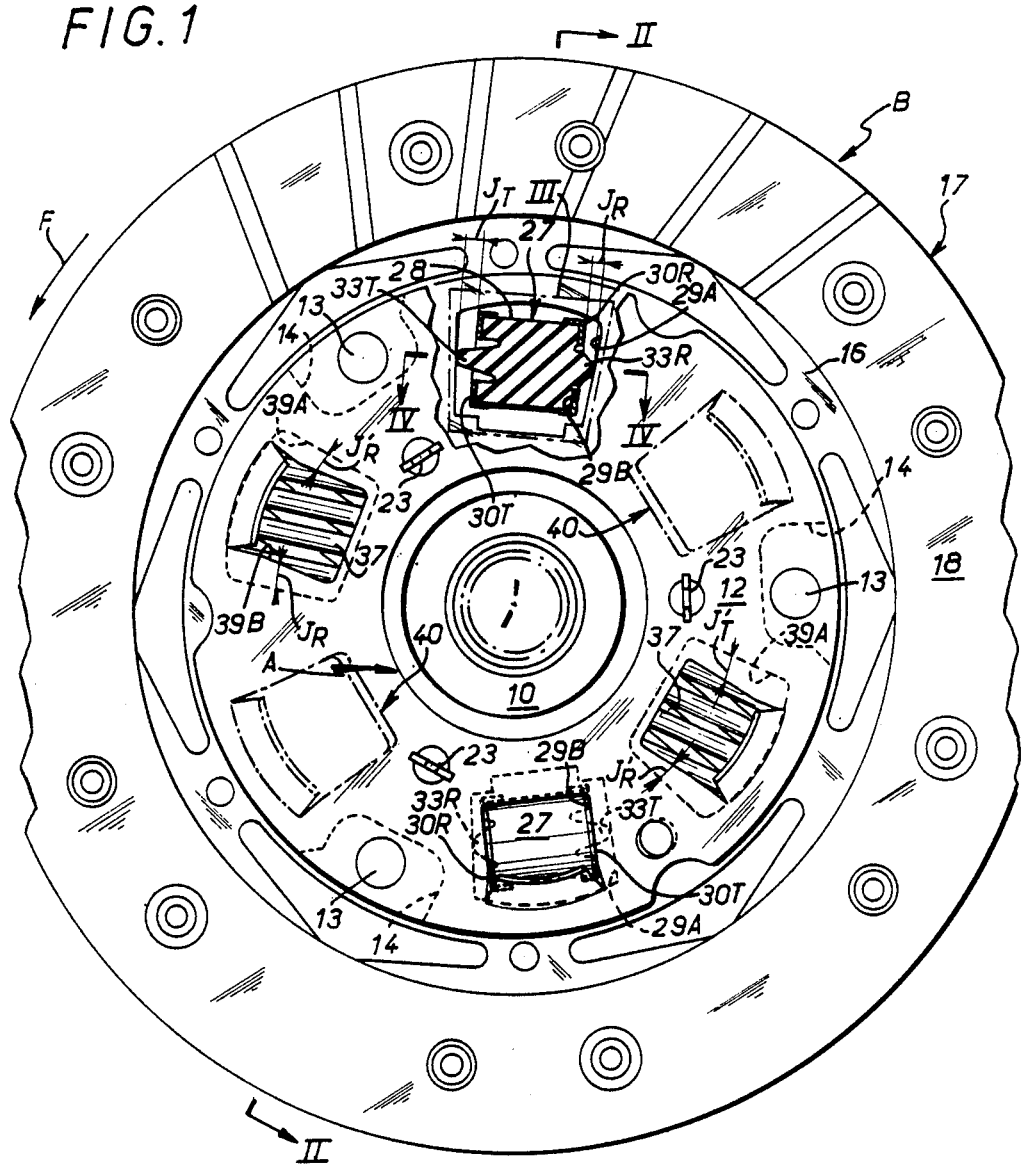
FIG. 1 is a partial view in elevation and partially cutaway of a torsional damper device in accordance with the invention, seen in the direction of the arrow I in FIG. 2.

As shown in these figures, the torsional damper device in accordance with the invention is applied, by way of example, to the construction of a damper hub type friction clutch for automotive vehicles.

In a general manner known per se, the torsional damper device comprises at least two coaxial parts A and B mounted so as to be rotatable relative to one another within predetermined limits of relative angular movement and against elastic means disposed between them in the circumferential direction and referred to hereinafter, for convenience, as circumferentially acting elastic means.

In the embodiment shown, there are only two coaxial parts A and B.

The coaxial part A, which in practice constitutes the driven part, comprises, in the embodiment shown, a hub 10 which, internally splined, for example and as shown here, is designed to be constrained to rotate with a shaft, in practice a driven shaft, the gearbox input shaft in the case of an automotive vehicle, and a hub disk 11 which is rigidly attached to the hub 10, being crimped to the latter, for example, as shown here.

Coaxial part B, which in practice constitutes the driving part, comprises, in the embodiment shown, two guide rings 12 which, disposed on respective opposite sides of the hub disk 11, parallel thereto and spaced therefrom, are rigidly attached together by means of pegs or other spacers 13 which pass with clearance through notches 14 formed for this purpose in the periphery of said hub disk 11.

In the present instance of a friction clutch for automotive vehicles, the coaxial part B further comprises a friction disk assembly 17 attached by its disk 16 to one of the guide rings 12, on the side thereof facing the hub disk 11 and attached to this guide ring 12 by the same spacers 13 which attach this guide ring 12 to the other guide ring 12. At the perimeter of each side of the friction disk assembly 17 are friction facings 18 by means of which the friction disk assembly is adapted to be gripped axially between two plates constrained to rotate with a shaft, in practice a driving shaft, the motor output shaft of the vehicle concerned.

In the embodiment shown, the disk 16 of the friction disk assembly 17 is of unitary construction and extends in the radial direction over the entire surface area of the guide ring 12 to which it is coupled; alternatively, it may be subdivided into vanes and extend in the radial direction over only the peripheral area of the guide ring 12 to which it is coupled.

In the following description, for reasons of simplicity, it will more often than not be regarded in the same category as the latter.

In the embodiment shown, on the side of the hub disk 11 facing the friction disk assembly 17 there is disposed, between the internal perimeter of the disk 16 of the latter and of the guide ring 12 to which it is coupled, on the one hand, and the hub 10, on the other hand, a bearing 20 attached to which is a radial flange 21 inserted axially between said hub disk 11 and disk 16 of the friction disk assembly 17.

Further, in the embodiment shown, there are inserted axially between the hub disk 11 and the other guide ring 12, on the one hand an action ring 22 which is constrained to rotate with said guide ring 12 by axial lugs 23 and carries a friction facing 24 in contact with the hub disk 11 and, on the other hand, between said action ring 22 and said guide ring 12, an axially elastic ring 25 of the kind, for example and as shown here, marketed under the trade name "ONDUFLEX".

These arrangements are well known per se and, as they do not constitute part of the present invention, will not be described in further detail here.

Also in a manner known per se, the circumferentially acting elastic means disposed between the coaxial parts A and B comprise a plurality of elastic members, to be described in detail hereinafter, which all extend substantially tangentially relative to a circumference of the assembly, the same direction for all these members in the embodiment shown, and which are in practice divided into a number of separate groups, of differing stiffness.

There are firstly elastic material blocks 27.

In the embodiment shown, these are two in number disposed in substantially diametrically opposite relationship to one another.

Each of these elastic material blocks 27, which has a substantially circular transverse cross-section with a flat 28 formed longitudinally along each of its circumferential edges, is partially housed in an opening provided for this purpose in the coaxial part A and formed, in practice, by an opening 29A in the hub disk 11 of the latter, and partially housed in an opening also provided for this purpose in the coaxial part B and formed, in practice, by openings 29B in the guide rings 12 of the coaxial part B.

In the rest configuration of the assembly, as shown in FIGS. 1 to 4, each elastic material block 27 is disposed without circumferential clearance in the openings 29B in the guide rings 12.

On the other hand it is housed with circumferential clearance in said rest configuration and for at least a first circumferential direction in the corresponding opening 29A in the hub disk 11.

In the embodiment shown, there is such circumferential clearance for both circumferential directions, of value JT for the circumferential direction corresponding to the more frequent direction of rotation of the assembly, as indicated by the arrow F in FIG. 1 and which corresponds to forward movement of the vehicle concerned, and of value JR for the opposite circumferential direction.

As measured in the angular sense, these two values JT and JR of circumferential clearance may be equal to one another.

In the embodiment shown, however, clearance JT in the circumferential direction corresponding to the more frequent direction of rotation of the assembly, being also the circumferential direction corresponding to operation of said assembly with increasing torque, is greater, as measured in the angular sense, than the clearance JR in the opposite circumferential direction, corresponding in practice to operation of the assembly with decreasing torque.

In the embodiment shown, to prevent deterioration of the elastic material blocks 27 through contact with the edges of the openings 29A, 29B in which they are disposed and to position them more accurately in these openings, there is associated with each of their circumferential ends a distribution and retaining plate 30T, 30R disposed in the circumferential direction between the end concerned and the corresponding edge of the corresponding opening 29B in the guide rings 12.

Like the elastic material blocks 27 whose end surfaces they cover, the distribution and retaining plates 30T, 30R in practice have a circular contour.

For attaching them to the elastic material blocks 27 they feature lugs 32 folded circumferentially at right angles and at substantially diametrically opposed positions relative to one another, in line with the flats 28 on the elastic material blocks 27.

If required, they may be, for example, glued to the elastic material blocks 27 equipped with them.

It will be understood that since their thickness increases the length of these blocks it is relative to their exposed surfaces and not relative to those of the elastic material blocks 27 that the circumferential clearances JT, JR are measured.

As described in the aforementioned French patent application No. 82 02034, each of the elastic material blocks 27 thus used has projecting from it in at least one circumferential direction at least one elastic material peg.

In the embodiment shown, a single elastic material peg of this kind is provided for each circumferential direction, 33T in the case of the circumferential direction indicated by the arrow F in FIG. 1 and 33R in the case of the opposite circumferential direction.

In practice, in this embodiment, an elastic material peg 33T, 33R of this kind is integral with the elastic material block 27 which carries it and projects from the median area of the corresponding circumferential end of this elastic material block 27, passing through the corresponding distribution and retaining plate 30T, 30R by means of a circular opening 34 provided for this purpose in the median area of the latter, with annular clearance j.

In accordance with the invention, and even for the rest configuration of the assembly as shown in FIGS. 1 to 4, the elastic material pegs 33T, 33R which each of the elastic material blocks 27 used thus features have their respective free ends in contact with the corresponding radial edges of the openings 29A in the hub disk 11 constituting the opening in the coaxial part A in which the elastic material block 27 is housed.

In practice, in the embodiment shown, the exterior contour of the elastic material pegs 33T is generally frustoconical and its free end is generally hemispherical; on the other hand, in this embodiment, the exterior contour of the elastic material peg 33R, which is shorter than the elastic material peg 33T, is generally cylindrical and its free end is generally frustoconical.

In accordance with the invention, at the root of each of the elastic material pegs 33T, 33R which it carries, each of the elastic material blocks 27 employed has a recess 35T, 35R.

In the embodiment shown, this is a groove which extends annularly around the elastic material peg 33T, 33R with which it is associated.

In practice, the surface of this groove 35T, 35R having the largest transverse dimension is aligned with the contour of the opening 34 in the corresponding distribution and retaining plate 30T, 30R and its surface having the smallest transverse dimension is aligned with the external surface of the peg 33T, 33R concerned, while its bottom has a rounded transverse profile, semicircular, for example.

Thus at least one of the flanks of the groove 35T, that of smaller diameter, is generally frustoconical in the embodiment shown.

It will be readily understood that the length of each elastic material peg 33T, 33R is increased by the depth of the groove 35T, 35R surrounding it and that it is just as if the root area of an elastic material peg 33T, 33R of this kind on the elastic material block 27 which carries it were offset circumferentially to the same degree.

In practice, in the embodiment shown, as elastic material peg 33T has a greater length in the circumferential direction than the associated elastic material peg 33R.

In accordance with the invention, the groove 35T, 35R which thus surrounds an elastic material peg 33T, 33R is adapted to at least partially accommodate the elastic material peg 33T, 33R when this is crushed in the circumferential direction, as will emerge hereinafter.

The size of this groove 35T, 35R is preferably in practice made sufficient for it to be able to fully accommodate the elastic material peg 33T, 33R which it surrounds when the latter is crushed in the circumferential direction, allowing for at least partial accommodation of said elastic material peg 33T, 33R in the space formed between it and the corresponding distribution and retaining plate 30T, 30R by virtue of the clearance j around the elastic material peg 33T, 33R in the central opening 34 in the distribution and retaining plate 30T, 30R.

In the embodiment shown in FIGS. 1 to 4, the elastic material pegs 33T, 33R carried by each of the elastic material blocks 27 are disposed without prestressing, in the rest configuration of the assembly, in the corresponding openings 29A in the hub disk 11 and, in the case of both elastic material blocks 27, the elastic material pegs having the greater circumferential length, that is the elastic material pegs 33T, both extend in the same circumferential direction.

The elastic members constituting the circumferentially acting elastic means disposed between the coaxial parts A and B further comprise, in the embodiment shown, helical coil springs 37.

In practice, in the embodiment shown, there are two of these springs 37 disposed in substantially diametrically opposed positions relative to one another.

Like the elastic material blocks 27, each is partially housed, with circumferential clearance J'T, J'R in the rest configuration of the assembly, in an opening provided for this purpose in the coaxial part A and formed in practice by an opening 39A in the hub disk 11 of the latter and also partially housed, without circumferential clearance in said rest configuration, in an opening also provided for this purpose in the coaxial part B and formed in practice by the openings 39B in the guide rings 12 of the latter.

As measured in the angular sense, the circumferential clearances J'T, J'R thus associated with the springs 37 are respectively greater than the clearances JT, JR associated with the elastic material blocks 27.

Also, the springs 37 are of greater stiffness than the elastic material blocks 27.

In operation with the direction of rotation of the assembly as indicated by the arrow F in FIG. 1 and the assembly operating with increasing torque, when torque is applied to the driving part B, the elastic material pegs 33T of the elastic material blocks 27 come into action immediately and alone during a first phase of operation and by virtue of their circumferential extent in accordance with the invention, yielding elastically.

Figure 6:
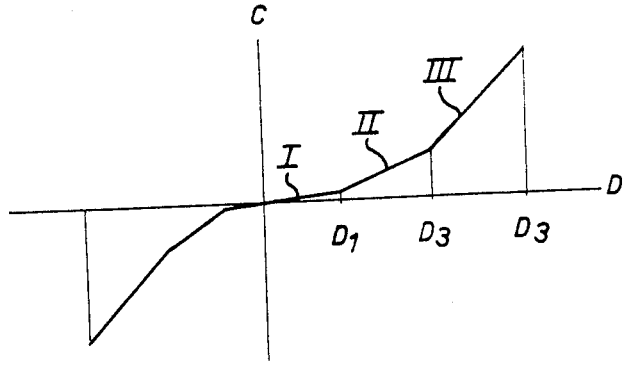
FIG. 6 is a diagram representing this operation.

In the graph shown in FIG. 6, the relative angular movement D between the driving part B and the driven part A is plotted on the abscissae against the torque C transmitted from one of these parts to the other, plotted along the ordinates. On this graph, this first phase of operation is represented by a straight line I, the slope of which is proportional to the stiffness of only the elastic material pegs 33T.

As they yield elastically, being crushed in the circumferential direction, the elastic material pegs 33T are accommodated in the groove 35T which, in accordance with the invention, surrounds them for this purpose (FIG. 5A).

In other words, by virtue of a groove of this kind, to which must naturally be added the annular volume due to the clearance j with which an elastic material peg 33T of this kind passes through the corresponding distribution and retaining plate 30T, the radial expansion to which the elastic material peg 33T is subjected as it is progressively crushed in the circumferential direction is unrestrained, eliminating the risk of deterioration.

This first phase of operation continues until, for a value D1 of relative angular movement corresponding to absorption of the circumferential clearance JT, the distribution and retaining plates 30T associated with the elastic material blocks 27 come into contact with the corresponding radial edges of the openings 29A in the hub disk 11 in which the elastic material blocks 27 are housed (FIG. 5A).

The elastic material blocks 27 then come into action and, during the second phase of operation which then begins, their elastic effect is combined with that of the elastic material pegs 33T, which remain compressed.

On the graph in FIG. 6, the curve representing this second phase of operation is a straight line II the slope of which, proportional to the combined stiffness, is greater than that of the previous straight line I.

When, for a value D2 of relative angular movement corresponding to absorption of the clearance J'T associated with the springs 37, the springs 37 in turn come into action, their effect being added to that of the elastic material blocks 27 and the elastic material pegs 33T, which remain compressed, a third phase of operation begins. On the graph in FIG. 6, the curve representing this third phase of operation is a straight line III the slope of which, proportional to the combined stiffness, is greater than that of the previous straight line II.

This third phase of operation in turn continues until, for a value D3 of relative angular movement, the driven part A is driven directly by the driving part B, either because at least some of the springs 37 have their turns contiguous or because the spacers 13 then come into contact with the corresponding edges of the notches 14 in the hub disk 11 through which they pass.

For operation of the assembly with reducing torque, the torque between the coaxial parts A and B reverses and, after retrograde rotational movement of driving part B relative to driven part A, a process similar to that described previously occurs, it being understood that at this time it is the elastic material pegs 33R which act.

Thus, in accordance with the invention, the elastic material pegs 33T, 33R themselves constitute elastic means of lower stiffness disposed in the circumferential direction between the coaxial parts A and D.

Because of this, there is no requirement to provide any springs specific to this purpose in constituting elastic means of lower stiffness of this kind.

To illustrate this advantage, FIG. 1 shows schematically in chain-dotted outline the housings 40 usually provided for installing the springs constituting such elastic means of lower stiffness.

If they are retained, these housings may be used with benefit to fit springs of higher stiffness, coming into action conjointly with or after the springs 37.

Alternatively, these housings may be eliminated, to strengthen the coaxial parts A and B.

It will be understood that in the foregoing, for reasons of simplification, no account has been taken of the well known hysteresis phenomenon which, due to friction between the coaxial parts A and B, results in a difference between the value of the torque transmitted between the coaxial parts A and B for increasing relative angular movement between them as compared with the torque transmitted between these coaxial parts for decreasing relative angular movement.

With regard to the elastic material peg 33T, 33R at least, this friction, similar to the torque, is due, in the embodiment shown, to the friction ring 24 with the elastic ring 25 to which the latter is subjected.

According to a modification of the invention (not shown) the friction ring 24 is eliminated and the elastic ring 25 with it, the internal friction due only to the elastic material pegs 33T, 33R being sufficient in this regard, given that there is further added to this mechanical friction of the free ends of the elastic material pegs on the corresponding radial edges of the openings 29A in the hub disk 11 in which the elastic material block 27 which carries them is disposed.

An arrangement of this kind is of particular advantage in that it is then certain that the friction developed will not be excessive and that the elastic means of low stiffness which come into action circumferentially for low values of the torque between the coaxial parts A and B are not at risk of being worn away, which is not always the case with the friction ring.

It will be understood that the friction ring 24 may be retained, the arrangement being such that it comes into action simultaneously with the elastic members of greater stiffness than the elastic material pegs 33T, 33R, in this instance the elastic material blocks 27 and/or the springs 37.

As arrangements of this kind are well known per se they will not be described in detail here.

In the alternative embodiment shown in FIG. 7, and in the rest configuration of the assembly, the elastic material pegs 33T at least are prestressed, and in the case of both of the two elastic material blocks 27 which carry them, they are in opposed relationship, these elastic material pegs 33T extending in opposite circumferential directions relative to one another.

It will be understood that various changes in the details, materials and arrangements of parts, which have been herein described and illustrated in order to explain the nature of the invention, may be made by those skilled in the art within the principle and scope of the invention as expressed in the appended claims.

In particular, as described in the aforementioned French patent application No. 82 02034, at least one of the elastic material pegs employed is not necessarily integral with the elastic material block which carries it.

Also, the recess provided in accordance with the invention at the root of an elastic material peg to accommodate the latter when it is crushed in the circumferential direction is not necessarily an annular groove.

A recess of this kind could equally well surround the elastic peg with which it is associated only partially, for example extending diametrally on both sides of the latter.

Also, the application of the invention is not limited to torsional damper devices comprising only two coaxial parts mounted rotatably relative to one another, but also covers cases where a torsional damper device of this kind comprises a greater number of coaxial parts mounted to rotate relative to one another in pairs.

Finally, the invention is not limited to friction clutch mechanisms for automotive vehicles, being more generally applicable to any type of torsional damper device.

I claim:

1. A torsional damper comprising at least two coaxial parts mounted so as to be rotatable relative to one another within predetermined limits of relative angular movement, staged circumferentially acting elastic means disposed between said coaxial parts in the circumferential direction and comprising at least one block of elastic material extending in a substantially tangential direction relative to a circumference of the damper and partially housed, without circumferntial clearance in a rest configuration of the damper, in an opening formed for this purpose in a first of said coaxial parts, and partially housed, with circumferential clearance in said rest configuration and for at least a first circumferential direction, in an opening formed for this purpose in a second of said coaxial parts, wherein said at least one elastic material block includes at least one integral elastic material peg projecting from the rest of the related block in said first circumferential direction even in said rest configuration, said at least one peg defining a first stage elastic means having low stiffness, the rest of said at least one block defining a second stage elastic means having higher stiffness than said first stage elastic means, said at least one elastic material peg being in contact with a corresponding radial edge of said opening in said second coaxial part, and the peg being operative as soon as there is any relative angular movement of said first and second coaxial parts.

2. A torsional damper according to claim 1, further comprising a recess on said at least one elastic material block at the root of said at least one elastic material peg and adapted to at least partially accommodate said peg when it is crushed in the circumferential direction.

3. A torsional damper according to claim 2, further comprising a distribution and retaining plate at one end of said at least one elastic material block and said at least one elastic material peg normally protruding circumferentially beyond said distribution and retaining plate, and wherein the size of said recess is sufficient to totally accommodate said peg when it is crushed in the circumferential direction, allowing for any partial accommodation of said peg in the space formed between it and said plate.

4. A torsional damper according to claim 2, wherein said recess is constituted by a groove extending annularly around said at least one elastic material peg.

5. A torsional damper according to claim 4, wherein the surface of said groove having the smallest transverse dimension is aligned with the external surface of said at least one elastic material peg.

6. A torsional damper according to claim 4, wherein at least one flank of said groove is of generally frustoconical form.

7. A torsional damper according to claim 2, wherein said at least one elastic material peg passes with clearance through an opening in said plate and normally extends circumferentially therebeyond, and the surface of said peg having the largest transverse dimension is aligned with the periphery of said opening.

8. A torsional damper according to claim 1, wherein said at least one elastic material peg is in one piece with said at least one leastic material block.

9. A torsional damper according to claim 1, wherein said at least one elastic material peg is preloaded in said rest configuration.

10. A torsional damper according to claim 9, wherein two circumferentially spaced said elastic material blocks are provided and wherein said elastic material peg on each of said blocks extends in opposite circumferential directions.

11. A torsional damper according to claim 1, wherein said at least one elastic material block carries a respective elastic material peg in each circumferential direction.

* * * * *